United States Patent [19]

Hodgin

[11] Patent Number: 4,752,000
[45] Date of Patent: Jun. 21, 1988

[54] ROLLER TYPE CONVEYOR WITH ROLLER DRIVE MECHANISM

[75] Inventor: Edwin Hodgin, Stourbridge, England

[73] Assignee: Garwood-Em Limited, Kingswinford, England

[21] Appl. No.: 829,069

[22] Filed: Feb. 13, 1986

[30] Foreign Application Priority Data

Feb. 16, 1985 [GB] United Kingdom ............... 8504031
Jun. 26, 1985 [GB] United Kingdom ............... 8516141

[51] Int. Cl.⁴ .............................................. B65G 13/06
[52] U.S. Cl. .................................... 198/781; 198/790; 198/791
[58] Field of Search ............... 198/781, 783, 789, 790, 198/791

[56] References Cited

U.S. PATENT DOCUMENTS

| | | | |
|---|---|---|---|
| 597,114 | 1/1898 | Jamieson | 198/791 X |
| 2,883,172 | 4/1959 | Mitchell | 198/790 X |
| 3,327,837 | 6/1967 | Covell | 198/789 |
| 3,513,960 | 5/1970 | Adams | 198/781 X |
| 3,537,568 | 11/1970 | Leach . | |
| 3,610,406 | 10/1971 | Fleischauer et al. | 198/789 |
| 3,716,129 | 2/1973 | Sadler, Jr. . | |
| 3,729,088 | 4/1973 | Stein et al. | 198/781 |
| 3,840,110 | 10/1974 | Molt et al. | 198/781 |
| 4,164,998 | 8/1979 | DeGood et al. | 198/790 X |
| 4,193,492 | 3/1980 | Hammond | 198/781 |
| 4,215,775 | 8/1980 | Gebhardt | 198/781 |
| 4,291,796 | 9/1981 | Gebhardt | 198/781 X |
| 4,325,474 | 4/1982 | Rae | 198/781 |

FOREIGN PATENT DOCUMENTS

| | | |
|---|---|---|
| 0004452 | 10/1979 | European Pat. Off. ............ 198/790 |
| 0095858 | 12/1983 | European Pat. Off. . |
| 0156518 | 10/1985 | European Pat. Off. . |
| 1556724 | 7/1970 | Fed. Rep. of Germany . |
| 3222028 | 1/1983 | Fed. Rep. of Germany . |
| 2095286 | 2/1972 | France . |
| 607975 | 2/1976 | Switzerland . |
| 1178094 | 1/1970 | United Kingdom . |
| 1413412 | 11/1975 | United Kingdom . |
| 1532522 | 11/1978 | United Kingdom . |
| 1536603 | 12/1978 | United Kingdom . |
| 2098566 | 11/1982 | United Kingdom . |

Primary Examiner—Joseph E. Valenza
Assistant Examiner—Jonathan D. Holmes
Attorney, Agent, or Firm—Cushman, Darby & Cushman

[57] ABSTRACT

A conveyor having a plurality of groups of rollers 12 arranged to be driven from a chain 26 or other driving element, a clutch mechanism 22 being engageable to connect the drive chain, and the rollers 12 of each group so that roller drive is engaged or interrupted simultaneously, the system being capable of being used as an accumulator conveyor wherein goods units 10 can be moved forward or stopped in succession at the delivery end of the conveyor, a preparation system being provided to prepare operation of clutch mechanism 22 for groups of rollers 12, in readiness for the arrival of a goods unit which, actuating a sensor 43, interrupts drive to a group of rollers 12 and prepares a preceding group of rollers 12 to have the drive thereto interrupted.

15 Claims, 7 Drawing Sheets

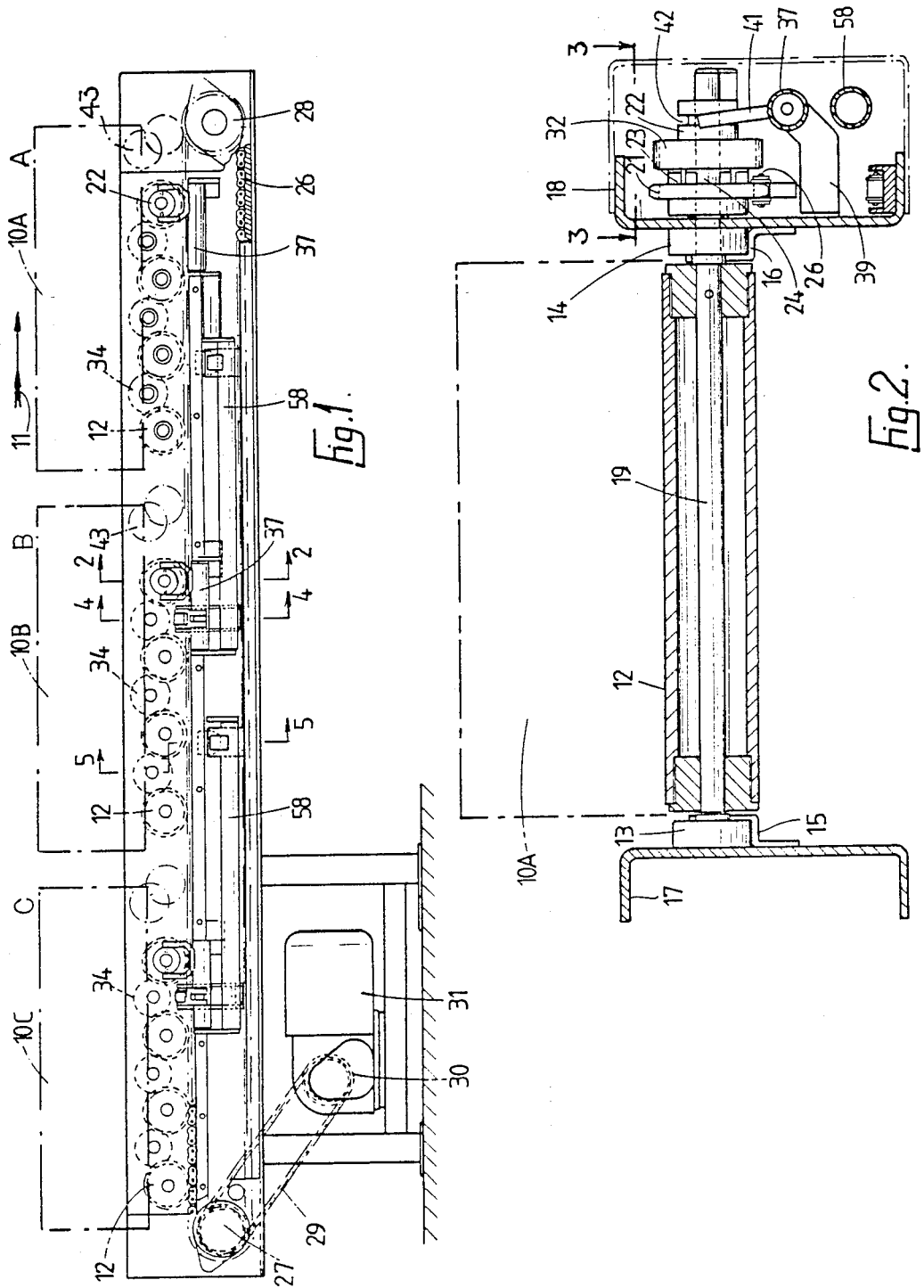

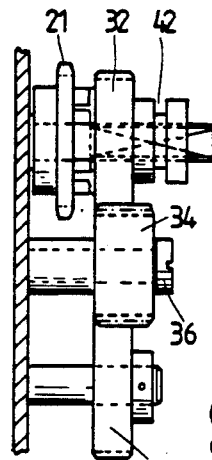
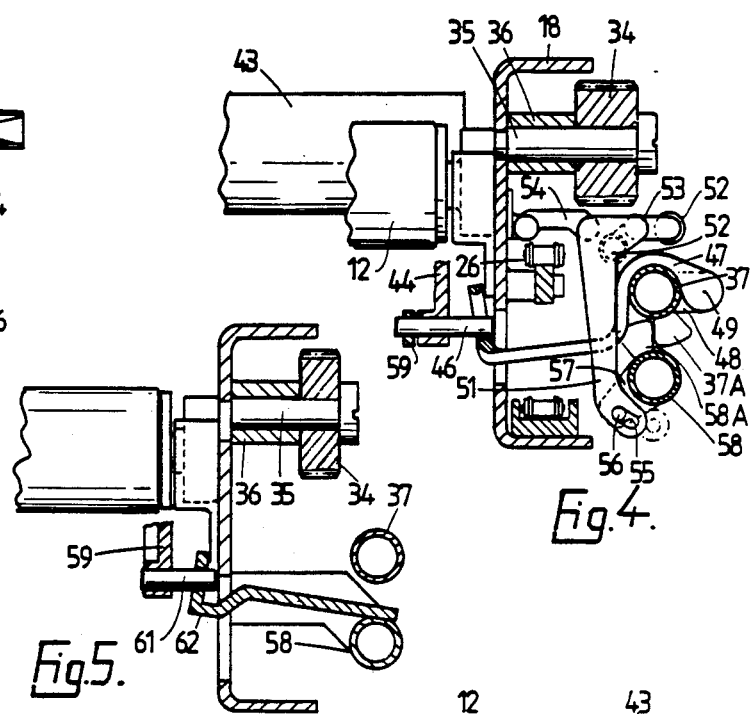
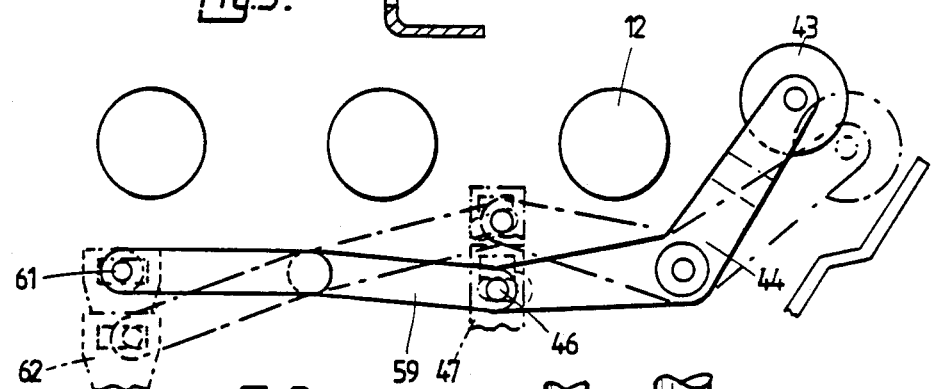
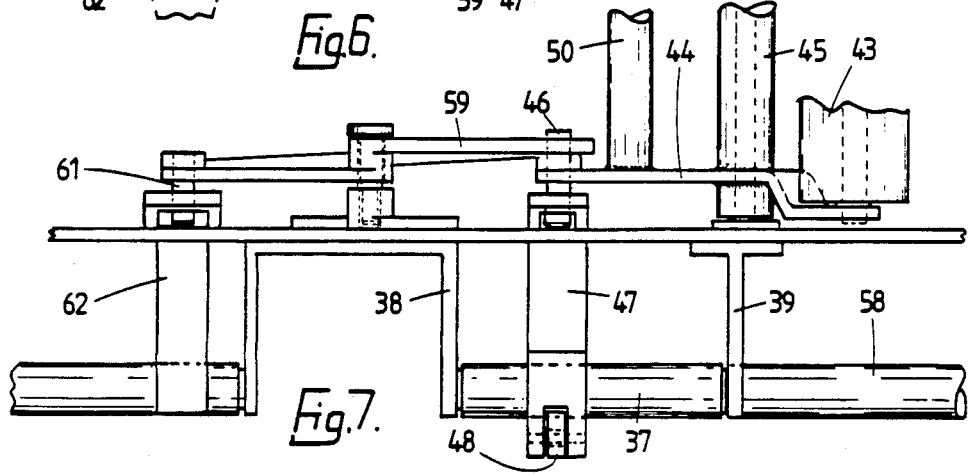

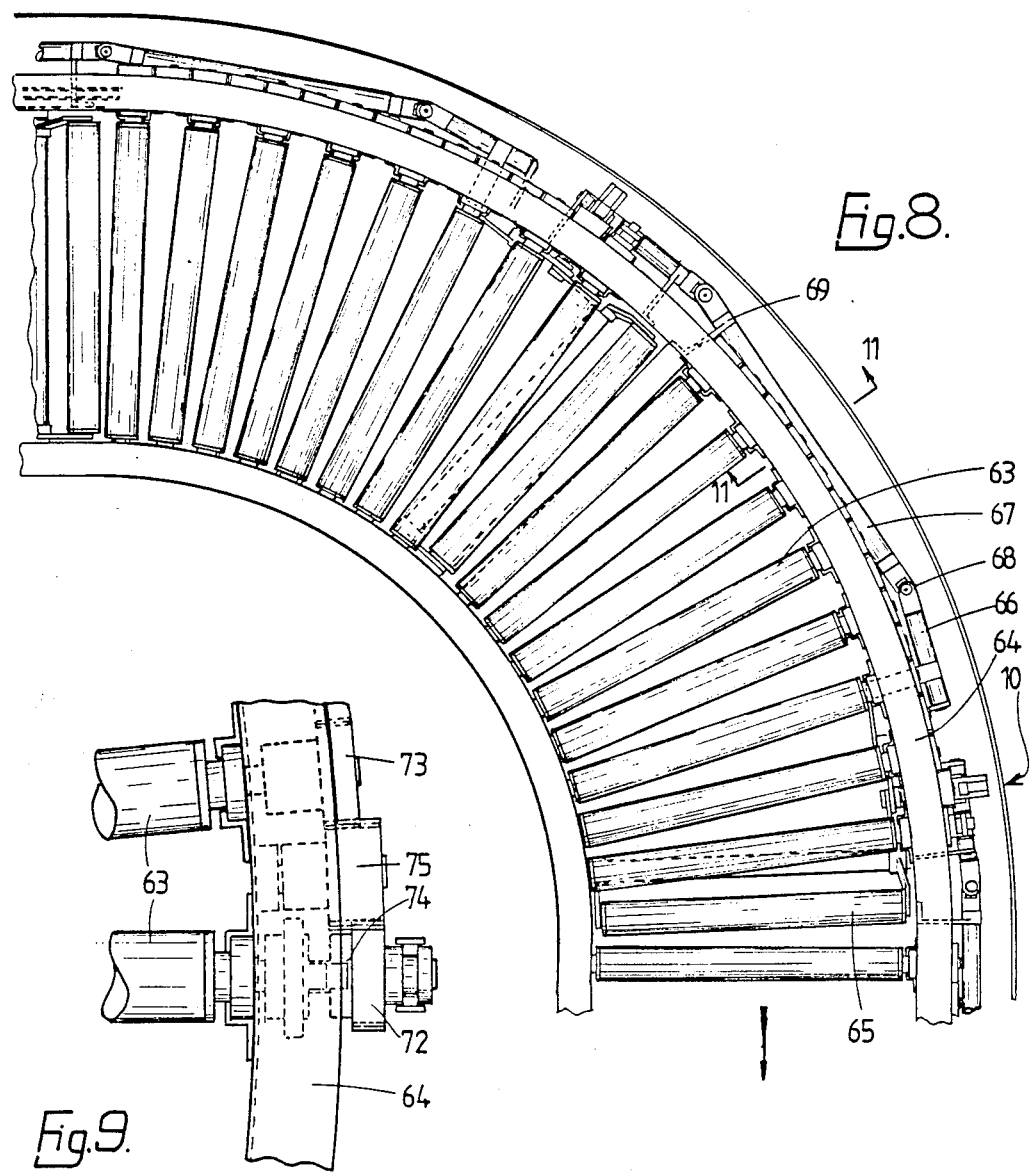
Fig. 8.
Fig. 9.
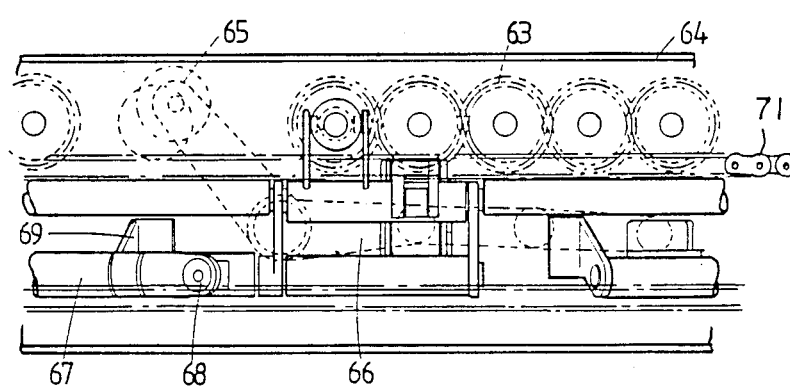
Fig. 10.

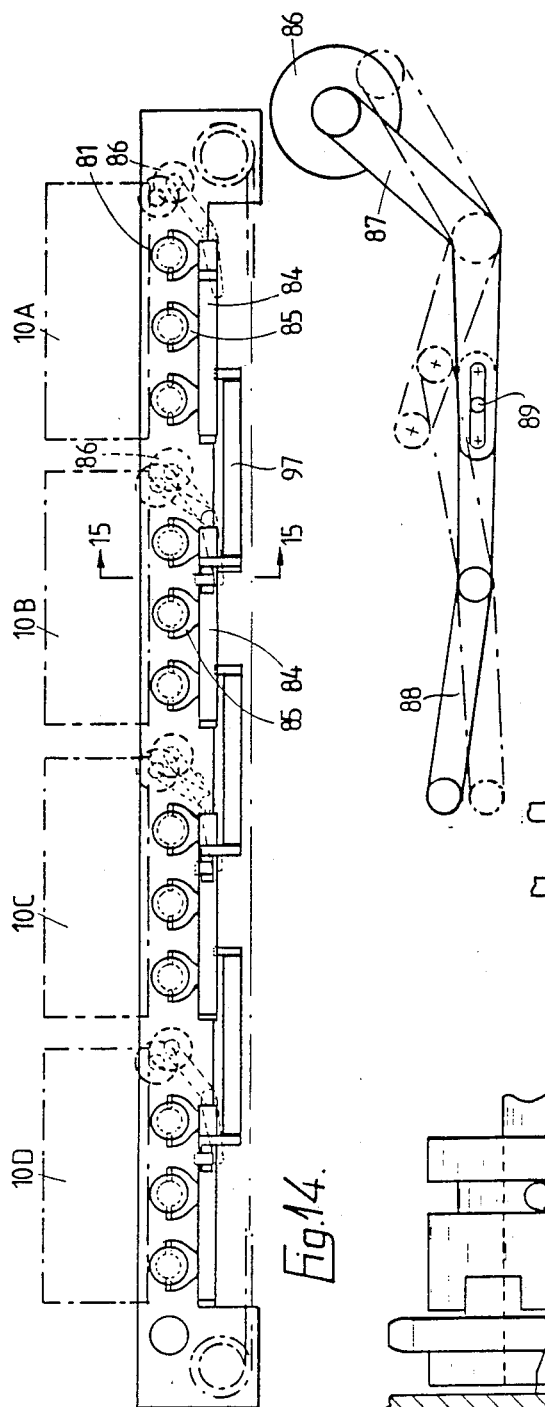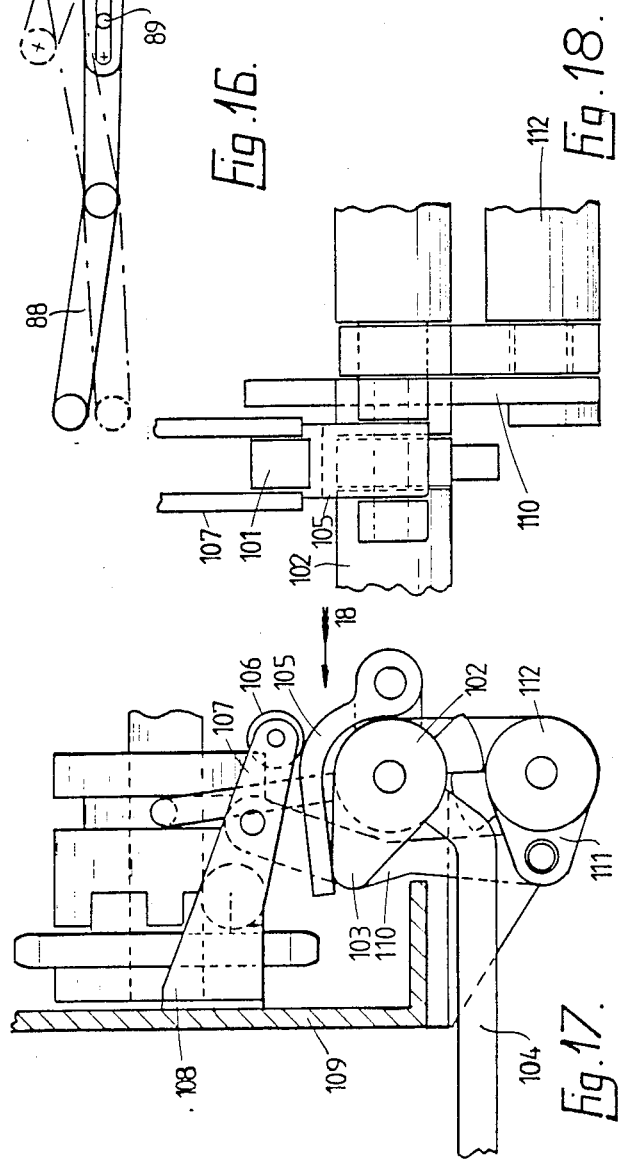

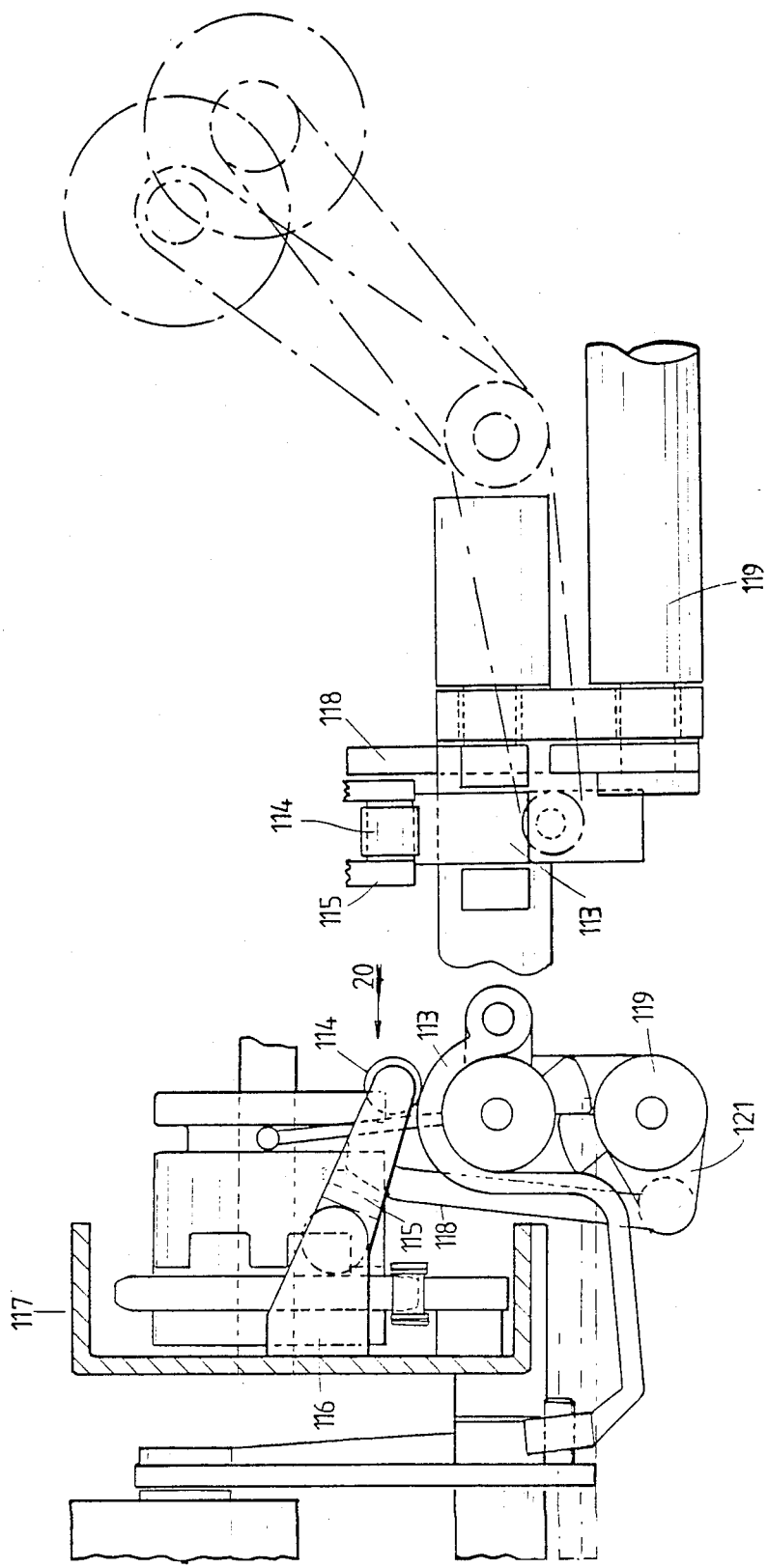

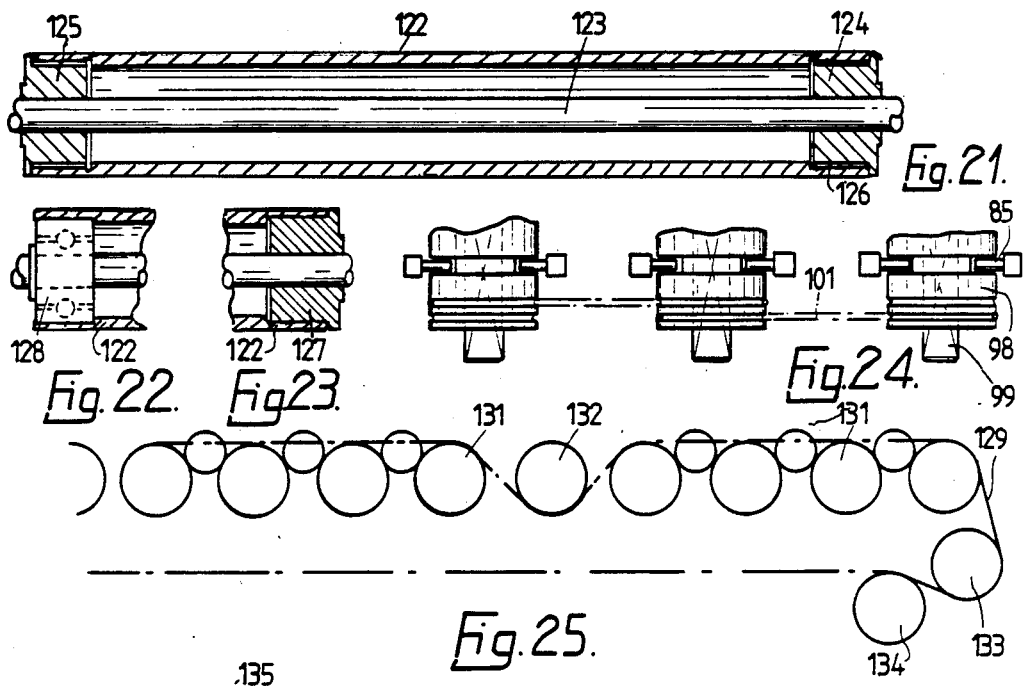
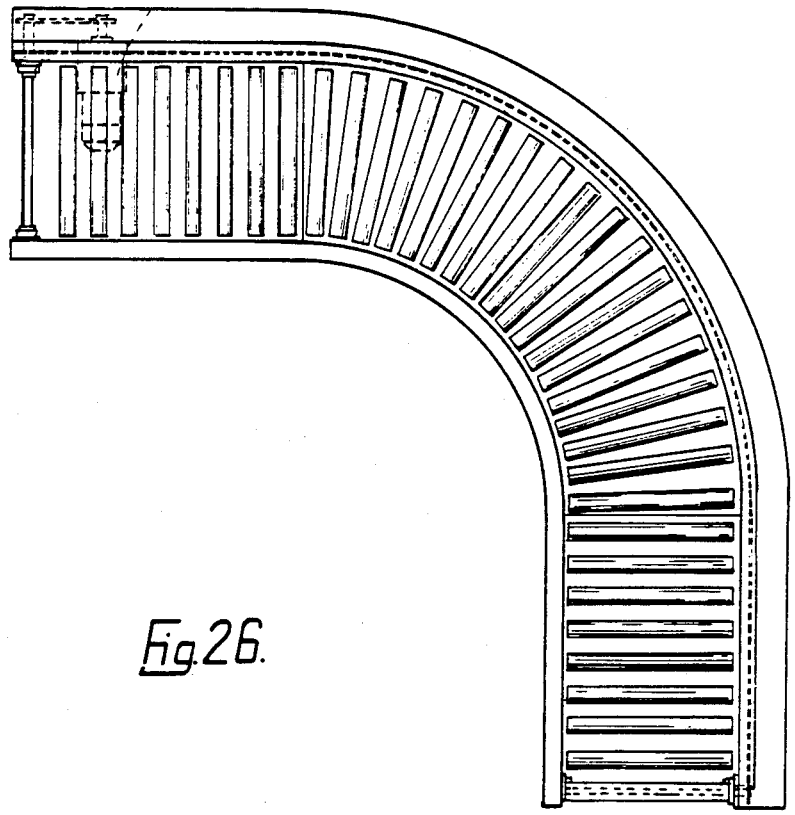

ROLLER TYPE CONVEYOR WITH ROLLER DRIVE MECHANISM

This invention relates to conveyors of the kind having a plurality of rollers, some or all of which are driven, to cause goods resting on the rollers to be conveyed along the length of the conveyor.

In this type of conveyor the rollers may be driven continuously but if the removal of goods from the delivery end or station of the conveyor does not keep pace with the supply at the feed end or station of the conveyor, the goods would collect at the delivery end and, if no other provision was made, would feed continuously off the end of the conveyor. If the goods which accumulate towards the delivery end are allowed to continue unchecked, the goods may become damaged or pile up, with the risk that goods may fall off the conveyor.

Accordingly, accumulator conveyors have been designed with provision to stop the drive rollers when there is a supply of goods at the delivery end which exceeds demand. Such accumulator conveyors operate in various ways, including actuation of clutches associated with the rollers whereby drive from a continuously driven chain, or other means, is interrupted when required.

The provision of clutches involves complex actuating and other mechanisms which require maintenance at regular intervals and, if a breakage occurs, the conveyor may be out of use for a significant period of time.

The accumulator conveyor may have the rollers arranged in groups of three or more, whereby a single product carried by the conveyor will be supported on such a group of rollers. The intention of a zero line accumulator conveyor is to bring successive units of the goods to rest, at the delivery end of the conveyor, without touching each other. Thus pressure from following units which may be still moving, will not result in units being pushed off the end of the conveyor. However, when called for, goods units can be moved forward to be discharged from the delivery end of the conveyor, one at a time.

Known accumulator conveyor systems are, however, in general, unreliable and can cause blockage of the goods units or can cause them to fail to be delivered when required. The unreliability of existing systems is related to the complexity of the mechanisms used and reliance upon springs and other devices which, if they fail, do not automatically prevent the conveyor from continuing to operate.

In GB-PS No. 1,413,412 Gebhardt, an example of a conveyor system is shown in which reliance is placed on springs or counterbalancing, which if they failed to operate, would not prevent goods units being driven off the end of the conveyor. Station preparation is by removing drive from part of the roller set of the preceding station and this is generally unsatisfactory in some circumstances.

GB-PS No. 1,532,522, Gebhardt, relies upon a positive drive system, as contrasted with a frictional drive principle but the arrangement is still subject to the problems associated with unreliability already referred to.

Other known systmes are shown in GB-PS No. 1,536,603 Interroll and DE-PS No. 1,556,724 which are subject to similar considerations.

It is the object of this invention to provide a conveyor having drivable rollers and in which there is provision for discontinuing the drive to the rollers, when goods being carried on the conveyor accumulate at the delivery end, the arrangement being simple, convenient and reliable in use, risk of incorrect operation being minimised.

In accordance with the present invention there is provided a conveyor having a plurality of drivable rollers arranged lengthwise of the conveyor and on which goods can be supported along the conveyor, the rollers being arranged in groups, the rollers being drivable from a drive means at one side of the conveyor, the rollers in each group being interconnected, characterised by clutch means whereby drive between the rollers in each group and the drive means can be engaged or interrupted simultaneously.

Preferably, each clutch means is arranged to be actuated in a direction axially of the associated roller and perpendicularly to the direction of travel of goods units along the conveyor.

In one example, the rollers of each group include only one clutch means whereby all the rollers, which are interconnected, are engaged for driving by the drive means or drive to all of these rollers is interrupted.

The conveyor is primarily intended for use as an accumulator conveyor in which goods units are stored at the delivery end and are stopped until a signal is applied to recommence delivery from the end of the conveyor. The goods units arriving at the delivery end are stopped in spaced positions so that following units which may still be moving do not push all those ahead of it. Thus orderly control of the goods units can be maintained. However, the conveyor can be used in other modes, for example, with a control arrangement in which all the goods units can be moved or stopped simultaneously.

The invention will now be described by way of example with reference to the accompanying drawings in which:

FIG. 1 is a side view of a preferred form of conveyor constructed in accordance with the invention;

FIG. 2 is an enlarged cross-sectional view of one of the rollers of the conveyor, with associated mechanism, on the line 2—2 in FIG. 1;

FIG. 3 is a plan view on the line 3—3 in FIG. 2;

FIG. 4 is a cross-sectional view on the line 4—4 in FIG. 1;

FIG. 5 is a further cross-sectional view on the line 5—5 in FIG. 1;

FIG. 6 is a view of the sensor roller and associated mechanism;

FIG. 7 is a plan view of the sensor roller and mechanism;

FIG. 8 is a smaller scale plan view of a bend constructed in accordance with the invention;

FIG. 9 is an enlarged plan view of part of the mechanism of the bend shown in FIG. 8;

FIG. 10 is a side view in the direction of arrow 10 in FIG. 8;

FIG. 14 is a side view of an alternative form of conveyor constructed in accordance with the invention;

FIG. 16 is a view of the sensor roller and levers of the FIG. 14 construction;

FIG. 17 is an enlarged cross-sectional view, equivalent to FIG. 15, of another alternative construction;

FIG. 18 is a partial view in the direction of arrow 18 in FIG. 17;

FIG. 19 is an enlarged cross-sectional, equivalent to FIG. 15, of a further alternative construction;

FIG. 20 is a side view of the mechanism shown in FIG. 19 in the direction of the arrow 20;

FIG. 21 is a cross-sectional view of one of the driven rollers;

FIG. 22 is a partial view of an alternative form of roller;

FIG. 23 is a further partial view of another form of roller;

FIG. 24 is a plan view showing a means whereby rollers can be maintained in synchronism with one another;

FIG. 25 is a diagrammatic view of an alternative form of roller drive; and

FIG. 26 is a plan view of an alternative form of bend construction.

Figure 11:
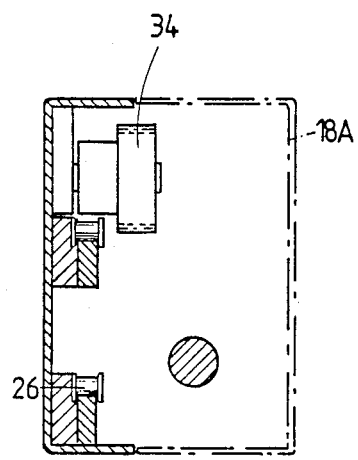
FIG. 11 is a cross-sectional view on the line 11—11 in FIG. 8.

The conveyor shown in FIGS. 1 to 11 is for transporting goods units, indicated in FIG. 1 as a series of boxes 10, three of which are identified as 10A, 10B, 10C. The direction of travel is indicated by arrow 11. The goods rest on a plurality of parallel rollers 12 arranged transversely of the length of the conveyor and disposed in groups of four. These are positioned at respective stations identified at A, B and C respectively and there may be any number of groups arranged in line and curves can be incorporated, as will be described.

The rollers 12 are cylindrical and are mounted on bearings 13, 14 carried in brackets 15, 16 secured to fixed channel-shaped side members 17, 18, of which the flanges are presented outwardly.

Through the centre of each roller 12 is a shaft 19 carrying end plugs frictionally engaged within a sleeve forming the roller. For each group of four rollers, one includes a drive and clutch mechanism. This is shown particularly at the right hand side of FIG. 2 and in FIG. 3. On the shaft 19, a clutch member 22 is axially slidable but non-rotatably fixed. Enclosed within the externally directed flanges of the side member 18, a sprocket 21 is rotatably mounted on the said shaft 19. The sprocket 21 and the clutch member 22 have respective inter-engageable dogs at 23, 24. When these are engaged the whole assembly rotates but when they are disengaged the roller, with the clutch member 22, can stop, though the sprocket continues to rotate. The direction of clutch engagement or disengagement is axially of the associated roller and thus perpendicular to the direction of travel of goods units along the conveyor.

Conveniently, the sprocket 21 and/or clutch member 22 are made from a low friction material such as nylon. The sprocket 21 engages a chain 26 extending lengthwise of the conveyor and running over end sprockets 27, 28. Suitable guides and supports are mounted to regulate the chain runs. The upper run of the chain 26 engages with the sprockets 21 at each roller position. The chain sprocket 27 is on a shaft carrying a sprocket engaging a chain 29 arranged to be driven from a further sprocket 30 driven, in use, by an electric motor 31 below the conveyor.

For the other three rollers in each group of four, drive is transmitted from the clutch member 22 on the one roller, through gears shown particularly in FIGS. 3 and 4. Each shaft of these other rollers carries a gear 33 and, in the case of the roller with which the clutch member 22 is associated, there is a gear 32 formed integrally as part of the clutch member 22. In the other three rollers, the gears 33 are non-rotatably fixed onto their respective shafts. Meshing with the gears 32 and 33 are intermediate gears 34. FIG. 4 shows a mounting for one of these intermediate gears 34 comprising a headed bolt 35 engaged in the side member 18. A spacer sleeve 36 holds the gear 34 in its correct position. The gear 34 is somewhat deeper than the two gears with which it meshes as shown in FIG. 3.

A clutch mechanism includes a clutch actuating tube 37 which is rotatably mounted in bearings 38, 39 and extending lengthwise of the conveyor. Secured to the tube 37 is a pair of fingers 31 with inwardly directed pins which engage in a groove 42 in the clutch member 22. This arrangement is seen particularly in FIG. 2.

Adjacent each group of four rollers, and in front of the group, there is a sensor roller 43 of full track width. This is therefore positioned at the side of the associated group in the direction of transport so that, as seen in FIG. 1, the goods 10 will travel across the driven rollers and then reach the sensor roller 43. One end of the sensor roller 43 is mounted on one limb of a bell crank lever 44 pivoted at its midpoint on the fixed side member 18 of the conveyor. The other end of the sensor roller is carried on a similar lever (not shown) connected to the bell crank lever by a rigid arm 45 and by a counterbalance bar 50 so that this assembly can swing together. The bell crank lever 44 carries a pin 46 engaging in a shaped clutch actuating arm 47. The connection between the pin 46 and the shaped arm 47 allows some relative angular movement as well as pivotal movement between them. The shaped arm is formed as a pressing with two flanges pivotally connected to a lug 48 on the tube 37 through a pivot pin 49. The arm is shaped partially to embrace the tube 37 through less than 180°.

In response to arrival of a goods unit into one of the stations, the sensor roller 43 is depressed. This causes the bell crank lever 44 to swing so that the pin 46 moves the shaped arm 47. If the shaped arm is constrained to remain in contact with the tube 37, the movement of the shaped arm 47 will be accompanied by angular movement of the tube 37. Such angular movement swings the associated fingers 41 to bring the clutch member 22 out of engagement with the sprocket 21. The sprocket will, however, continue to rotate since it is continuously driven by the chain 26 but it will simply rotate on the shaft 19 without transmitting any rotation to it. As the clutch is disengaged, the other three shafts 19 in the same group of rollers will also cease to rotate.

However, if the shaped arm 47 is allowed to move away from the tube 37 in contact with it, movement of the shaped arm 47 will not result in angular movement of the tube 37 and instead the shaped arm 47 will simply pivot about the pin 49. To hold the shaped arm 47 into contact with the tube 37 or to allow the relative movement between them, a further mechanism is provided.

The mechanism comprises a forked or double preparation lever 51 which is generally of inverted L-shape. The shorter upper portion carries a pair of rollers 52 on a short pivotted member 53. A steadying arm 54 connects this upper end of the preparation lever 51 with the side member 18 of the conveyor. The lower end of the preparation lever 51 has a curved portion in which is an oval hole 55 in which engages a pin 56 on a lug 57 carried on a preparation tube 58 mounted below the tube 37 on a further bracket in the side member 18. As can be seen from FIG. 4, the lower end of the lever 51 is curved generally below the preparation tube 58. Furthermore, the lug 57 swings downwardly, when the tube 58 moves in an anti-clockwide direction, as indicated in FIG. 4, to bring the lower end of the lever 51 to the bottom dead centre position, thus resisting any tendency for reverse forces to lift the rollers 52 off the arm 47.

There is a further bell crank lever 59 also pivoted on the side member of the conveyor, one end being slotted to engage over the pin 47, it its opposite end from the shaped arm 47. The other end of the bell crank lever 59 carries a pin 61. This engages in a slot in one end of a lever 62 which is tangentially secured to the preparation tube 58 of the preceding station. As seen in FIG. 6 the bell crank levers 44 and 59 swing in opposite directions when the sensor roller 43 is depressed.

The shaped arm 47 and the lever 62 pass through respective openings in the side member 18. The arrangement is such that when the sensor roller is depressed the bell crank lever 44 causes the shaped lever arm to be moved up through the pin 46 but the lever 62 is moved down simultaneously. Thus the rollers 52 are brought down into contact with the shaped arm 47 to produce rotation of the tube 37 to disengage the clutch.

On the tube 37 there is provided a finger 37a and a corresponding finger 58a is provided on the preparation tube 58. As shown in FIG. 4, these are in contact with one another. This corresponds with the clutch engaged position. When the clutch is to be disengaged, the preparation lever 51 is moved downwardly by angular movement of the preparation tube 58 in an anti-clockwise direction. When the shaped arm 47 is moved, this will cause the tube 37 to be moved angularly in a clockwise direction, thus disengaging the clutch. When the clutch is to be re-engaged the preparation tube 58 is rotated in a clockwise direction and since the fingers 37a and 58a will contact one another, the clutch actuating tube 37 will be pushed in an anti-clockwise direction, to re-engage the clutch. It will, however, be understood that it is the sensor roller 43 of the station in front, or downstream of the conveyor which controls the relevant clutch is the manner described.

The arrangement in use is that the goods units 10 will move along the conveyor while all the drivable rollers 12 remain in driving condition, with the clutches in each group engaged. As one of the units 10A reaches the delivery end of the conveyor, it will depress the sensor roller 43 at the end station. There are alternatives for the sequence of events which follow. A signal may be produced which alerts an operator to the need to control the conveyor or, alternatively, the unit 10A may be allowed to continue off the end of the conveyor to another machine or other destination as required. Control of the conveyor may involve allowing goods units to accumulate and be stored on the conveyor. However, the goods may arrive irregularly and thus it is required that they should fill the stations in turn and, at least in this example, be spaced apart at equal spacing as shown.

In further alternative arrangements, the signal triggered by the arrival of a goods unit 10A at the end or last station, may generate an automatic response to the equipment downstream of the conveyor.

Whichever system, manual or automatic, is used, an actuator controls angular movement of the preparation tube 58 in station A. As this occurs, the unit 10A will stop.

Simultaneously with such operation, the bell crank levers 44 and 59 will move. Movement of the bell crank lever 59 transmits movement to the preparation lever 51 to bring the rollers 52 carried thereby into contact with the shaped arm 47. This brings the station B into readiness to stop the group of rollers 12 at that station. However, actual stopping of the rollers 12 will not occur until the next unit 10B arrives in station B and depresses the sensor roller 43 in that station. The movement of that sensor roller 43 now moves the tube 37 which disengages the clutch for the group of four rollers in this station. This is then arranged to produce movement of the preparation tube 58 for the next group of rollers 12 at station C to bring these into readiness to be disengaged when a further unit arrives in that station. The sequence, as described, will recur until all stations are filled.

When the goods unit 10A is required to move on, the operator activates the manual actuator or, in the alternative, automatic operation of the actuator takes place.

This results in rotation of the tube 37, in the manner already described, in the direction to re-engage the clutch associated with the group of four rollers at station A. When drive starts, the goods unit 10A moves onward. The fact that the adjacent sensor roller 43 is depressed as the unit 10A passes over it, does not stop the roller drive because, in this station A, the sensor roller only provides a signal for the actuator. As the unit 10A leaves the conveyor the sensor roller 43 will rise, thus moving the bell crank levers 44, 59 to their alternative positions. The effect of this will be that, as the bell crank lever 59 at station A moves, the appropriate preparation tube 58 is moved to rotate the tube 37 through fingers 37a and 58a, to re-engage the clutch for the rollers in the preceding station, that is station B. As the unit 10B moves on, it will clear the sensor roller 43 at station B, enabling the same sequence to occur at the next station. Sequential operation will occur until there is need to hold up supply from the delivery end again.

With the arrangement described, the goods units will move on at spaced intervals and will not catch up with one another. FIGS. 8, 9 and, 10 show a bend which can be incorporated in a conveyor run. Although a 90° bend is shown, any angle can be used, as may be required. In place of the parallel rollers 12 of the straight section already described, the rollers 63 are arranged at respective angles, as shown. The clutches and associated mechanisms are situated on the outside of the end and are mounted on the side member 64. The rollers 63 are arranged in groups of eight with a sensor roller 65 at the front. The type of mechanism is the same as that shown in the apparatus in FIGS. 1 to 7. However, in view of the curvature, the tubes equivalent to the tubes 58 have to be jointed. The operative parts of these tubes are identified at 66 and extensions 67 are connected through universal joints 68. These are, furthermore, supported by brackets 69. The drive chain 71 also requires some guidance in order to carry it around the bend without risk that it will leave the sprockets. The bend apparatus may be a separate unit, for incorporation in a complete conveyor system or it may be built in, using the same drive chain as adjacent straight sections.

FIG. 9 shows two adjacent rollers 63 and the gears 72, 73 carried on their shafts, the gear 72 being associated with the clutch mechanism 74. The gears 72, 73 are both in mesh with an intermediate gear 75. The depth of this is greater than the gears 72, 73. Despite the angular relationship of the rollers 63 and therefore of the gears 72, 73 inward and outward movement of gear 72, upon clutch operation, is permitted by a relatively deep mesh when the gear 72 is in its inward position and a shallower but still adequate mesh when in the outward position.

FIG. 11 also shows a guard 18A which encloses the entire mechanisms. The guard is of simple channel shape and is easily removed or replaced without complex dismantling of other parts. This type of guard may be used on the band as well as on the straight sections.

Figure 12:
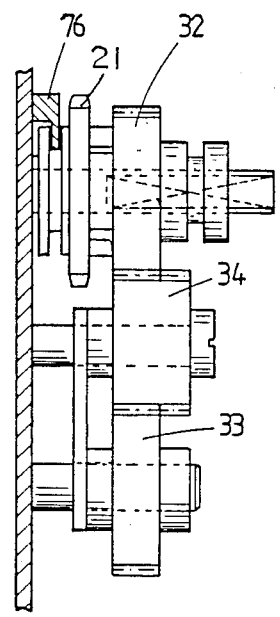
FIG. 12 is a view, equivalent to FIG. 3, showing an alternative arrangement.

In an alternative arrangement, shown in FIG. 12 the gears 32, 33, 34 are mounted in a different manner, allowing some adjustment and also shown is a means 76 which is designed to restrain the sprocket 21 against outward movement when the clutch is disengaged.

Figure 13:
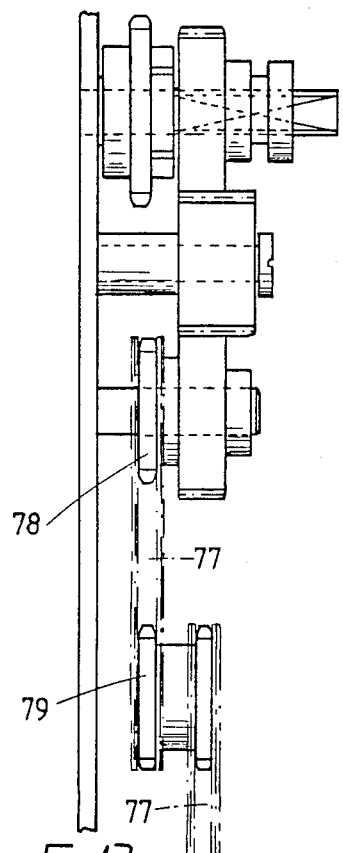
FIG. 13 shows a further alternative construction, equivalent to FIG. 3.

FIG. 13 shows a further alternative arrangement in which adjacent rollers, not including that having the clutch mechanism, are interconnected by short chains 77 engaged on sprockets 78, 79. On conveyors which are designed for lighter loads, belts may be substituted.

If it is desired that all the goods units should move on substantially simultaneously, this can be achieved by ensuring that, when the first tube 37 at station A is rotated by its actuator, this will cause simultaneous rotation of the tubes 48 to release the system at station B from inhibiting engagement of the clutch at that station, and so on to the other stations. This can be achieved simply by connecting the tubes 37 and 58 together by gearing. The system will, however, be capable of storing or accumulating units at spaced positions along the conveyor, as described in relation to the drawings, when the unit at station A is stopped. The same release of drive and readying of the next adjacent station behind will occur as already described.

Figure 15:
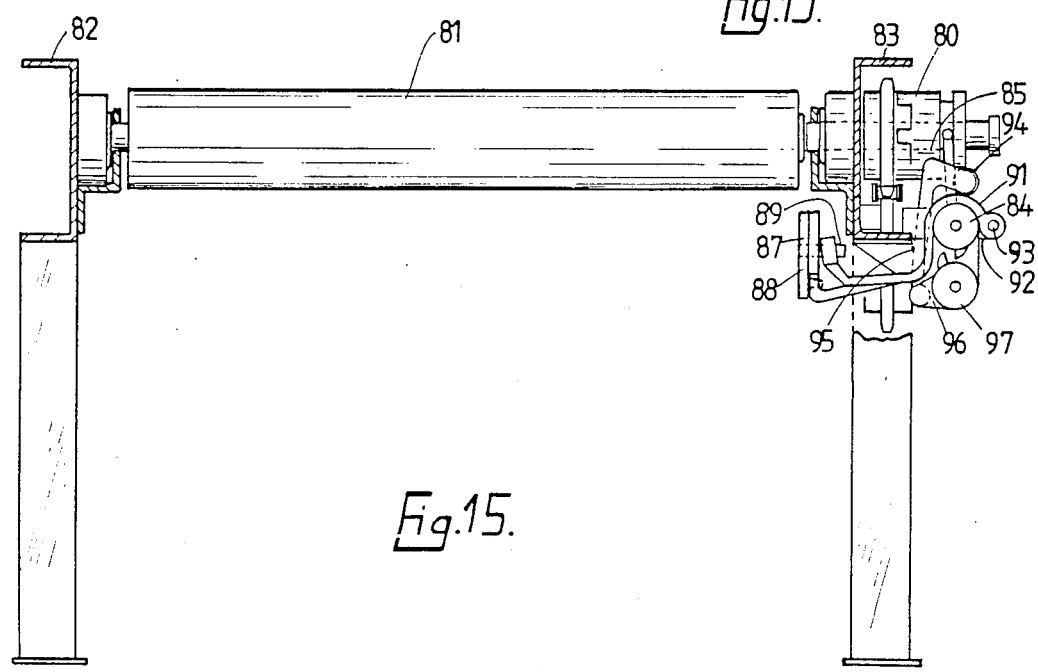
FIG. 15 is an enlarged cross-sectional view on the line 15—15 in FIG. 14.

The conveyor shown in FIGS. 14, 15, 16 includes rollers 81.

As seen in FIG. 14 four stations are shown. The rollers 81 are similar to those in the construction shown in FIGS. 1 to 11 and are mounted in channel shaped side members 82, 83.

In place of the single clutch for each group of rollers, this form of conveyor has individual clutches for each roller 81. It can be seen from FIG. 14 that there are tubes 84, equivalent to the tubes 37 which are, however, longer, extending below all the rollers 81 in each group. These tubes carry spaced pairs of forks 85 engaging clutch mechanisms on each roller spindle, the clutch mechanisms being of the same design as those already described.

In front of each group of rollers 81 is a sensor roller 86 carried on bell crank levers, one of which is shown at 87 in FIG. 16. This is, in turn, connected to a second bell crank lever 88. A connecting pin 89 engages in a slot to allow for the required relative movement between the bell crank levers 87, 88. A shaped arm clutch actuator 91, engaged on the end of the pin 89, through a slot in that arm, partially surrounds the tube 84 and is pivotted to a lug 92 on the tube 84 by a pin 93. To hold the shaped arm 91 into contact with the tube 84 there is a roller 94 carried by an inverted L-shaped preparation lever 95 which, at its lower end, is connected to a lug 96 on a lower, preparation tube 97.

On the two tubes 84, 97, where they overlap lengthwise of the conveyor, they carry respective dog tooth shaped projections which can interengage. The purpose of these is to hold the tubes 84, 97 in correct relative positions, on engagement, though the counterbalance of the bell crank lever 87 serves this purpose also.

Operation of this mechanism is similar to that already described, though the clutches for all the rollers 81 in each group are actuated simultaneously. FIG. 24 shows an alternative arrangement which is intended to ensure that the clutches will actuate simultaneously, particularly when closing or engaging. Each of the clutch members 98 carried on the spindles 99 are grooved to carry thin belts 101 connecting adjacent clutch members 98. Any rotation of one clutch member 98, when the clutches are disengaged, will therefore be accompanied by rotation of all the others in the group, so that when they are to be re-engaged, all the dogs will be in correct positions for re-engagement.

FIGS. 17 and 18 show an alternative arrangement in which the tube 102, equivalent to tube 37, has a lobe 103 and is pivotally carried on an arm 104 secured to the conveyor side member 109. Over the tube and lobe is a pivotted lever 105 which can be held down by a roller 106 or not as the case may be. This lever 105 is pivotally connected to a lug on the tube 102. The roller 106 is carried on a double arm 107 pivotted to a bracket 108 secured to the side member 109. A lever 110 connects the arm 107 and the lobe 103 to a lug 111 on the lower, preparation tube 112. The roller 106 may, in another example, be replaced by a shoe.

FIGS. 19 and 20 show a further alternative arrangement in which a shaped arm 113 is similar to the shaped arm 47, as seen in FIG. 4. Bearing on this is a roller 114 carried on a double arm 115 pivotted to a bracket 116 on the side member 117. A lever 118 is connected to the lower, preparation tube 119 through a lug 121, as in FIG. 17. In this example, the shaped arm 113 is below the side member 117.

FIG. 21 shows, in cross-section, a form of the roller which enables drive to the actual bad carrying surface of the roller to be discontinued, other than by the clutch arrangements, if some obstruction stops or slows the goods which are resting, for the time being, on a roller or group of rollers. This prevents excessive pressure building up between adjacent units if they become closed up together.

In the arrangement shown, the roller comprises a cylindrical tube 122 through the interior of which the shaft 123 passes. Plugs 124, 125 in each end of the tube 122 are fixed to the shaft 123 in non-rotatable manner. Each of the plugs, in this example, is a generally cylindrical part having a flange at one end and a nylon or other low friction sleeve 126. There is small clearance between the interior of the tube 122 and the sleeve 126. When the shaft 123 is rotating, the plugs rotate with it. Normally, the tube 122 rotates also, through frictional contact with the plugs. However, should there be resistance to rotation of the roller, through stopping or slowing of the goods units, the tube 122 will stop but the plugs and shaft will continue to rotate.

In an alternative arrangement shown in FIG. 23, the whole plug 127 is made from nylon or other low friction material. In the still further alternative illustrated in FIG. 22, the roller end opposite to the sprocket and clutch member has a plug incorporating a ball bearing 128.

It is however possible to use fixed rollers in which the tube 122 is simply fixed relative to the central shaft 123.

In an alternative arrangement, the chain and sprockets may be replaced by a lay shaft running the length of the conveyor and sets of meshing bevel gears, one of each set replacing the sprocket and the other being secured on the lay shaft.

FIG. 25 shows an alternative arrangement of a drive chain 129 for driving all the sprockets 131 on the respective rollers. A further sprocket 132 is placed between the ends of adjacent roller groups and the chain 129 is passed under this so as to give engagement over a greater portion of the periphery of the sprocket 132, as well as over the adjacent roller sprockets 131. This Figure also shows an alternative drive and tensioning arrangement for the chain, incorporating a drive sprocket 133 and a tensioning sprocket 134.

FIG. 26 shows an alternative bend construction, made up as a separate unit. This has a curved section and two straight sections. The motor 135 is mounted below the conveyor where access below is limited, the motor may be mounted to one side of the conveyor.

Control of the conveyor will involve allowing goods units to accumulate and be stored on the conveyor. However, the goods may arrive irregularly and thus it is required that they should fill the stations in turn and, at least in this example, be spaced apart at equal spacing as shown.

The signal triggered by the arrival of a goods unit 10 at the end or last station A, may be for manual selection or may produce an automatic response generated by following equipment or otherwise.

Whichever system, manual or automatic, is used, the actuator controls angular movement of the tube 37 in station A. Such actuator (which is not shown in the drawings) may be a motorised actuator, air cylinder or electrical or mechanical device which moves the tube angularly, as described, when required.

In a still further arrangement, the principle of preparation of previous groups of rollers may not be used, but groups of rollers are interconnected through mechanisms including equivalents of the tubes 37, controlled by sensor rollers 43, which, however, simultaneously engage or disengage drive to more than one roller group. In certain of these arrangements it is possible to construct an accumulator type of conveyor.

Although not illustrated, it is possible to fit rollers on vertical axes to the tops of the two side members, to serve as guides to control the goods units as they move along the conveyor. This reduces frictional contact between the goods and the conveyor, along the sides.

I claim:

1. A conveyor comprising a plurality of rollers spaced apart along a conveying path and extending transversely thereof and rotatable to transport goods supported on said rollers along said conveying path, said rollers comprising a plurality of groups of rollers, rotatable roller shafts carrying said rollers and having axes disposed in parallel, drive means arranged to drive said rollers by rotation of said roller shafts, a plurality of clutch means each associated with a respective group of said rollers and operative, when engaged, to simultaneously connect all the rollers of said group to said drive means to drive said rollers and, when disengaged, to simultaneously disconnect all the rollers of said group from said drive means, said clutch means being mounted on said roller shafts and being movable axially of said roller shafts between the engaged and disengaged states, a respective clutch actuator for actuating each clutch means, a plurality of preparation means each for placing a respective one of said clutch actuators in readiness to actuate the associated clutch means, each preparation means incorporating a respective elongate member extending longitudinally of said conveying path and being angularly movable about its longitudinal axis and a preparation member coupled to said elongate member so as to be movable therewith, each preparation member having a portion thereof engageable with an associated clutch actuator and being movable between a first position in which the clutch actuator is prevented from actuating the clutch means in order to engage the clutch means, and a second position in which the clutch actuator is enabled to actuate the clutch means, and a plurality of sensor means each associated with a respective group of said rollers and operative, when triggered by passing goods, to actuate both the clutch actuator means associated with said group of rollers and the preparation means associated with a preceding group of rollers, whereby the clutch actuator associated with said preceding group of rollers is placed by the preparation means in readiness to actuate the associated clutch means when the sensor means associated with said preceding group of rollers is subsequently triggered by passing goods.

2. A conveyor as claimed in claim 1 wherein the clutch means and associated actuators are disposed at one side of the conveyor, being at least partly enclosed by a side member of the conveyor and being accessible externally of the conveyor side member.

3. A conveyor as claimed in claim 1 wherein said clutch means comprises a single clutch associated with each group of rollers, whereby drive between all the rollers in the group and the drive means is engaged and interrupted by said clutch.

4. A conveyor as claimed in claim 3 wherein respective transmission means are provided for transmitting drive between all the rollers of each group.

5. A conveyor as claimed in claim 4 wherein the transmission means comprises gears.

6. A conveyor as claimed in claim 4 wherein the transmission means comprises chains.

7. A conveyor as claimed in claim 4 wherein the transmission means comprises belts.

8. A conveyor as claimed in claim 1 wherein said clutch means comprises a respective clutch associated with each roller in each group of rollers, and means for actuating all the clutches associated with a respective group of rollers simultaneously.

9. A conveyor as claimed in claim 8 wherein the rollers of each group are arranged to be actuated by a single common angularly movable member.

10. A conveyor as claimed in claim 9 including synchronising means for synchronising the clutch means to ensure simultaneous engagement of the said clutch means in each group.

11. A conveyor as claimed in claim 1 wherein the preparation member, in its second position, is moved beyond a condition in which loads applied in a direction opposite to normal actuating loads can move it to its first position.

12. A conveyor as claimed in claim 1 wherein said portion of the preparation member is a rotary anti-friction element.

13. A conveyor as claimed in claim 1 including a bend portion in which the rollers are arranged in groups and associated angularly movable members comprise parts interconnected by universal joints.

14. A conveyor as claimed in claim 1 in which at least some of the rollers include inner and outer concentric portions, said portions normally being movable in unison but being capable of independent movement in the event of high resistance to rotation.

15. A conveyor as claimed in claim 1 in which the drive means includes a chain connecting the respective clutch means, through respective sprockets.

* * * * *